United States Patent [19]
Fontaine

[11] Patent Number: 5,343,918
[45] Date of Patent: Sep. 6, 1994

[54] TREAD FOR A PNEUMATIC TIRE WITH DIFFERING TREAD STIFFNESS REGIONS

[75] Inventor: Jean F. L. Fontaine, Burden, Luxembourg

[73] Assignee: The Goodyear Tire & Rubber Company, Akron, Ohio

[21] Appl. No.: 913,125

[22] Filed: Jul. 13, 1992

Related U.S. Application Data

[63] Continuation-in-part of Ser. No. 524,616, May 17, 1990, abandoned.

[51] Int. Cl.$^5$ ............................................. B60C 11/11
[52] U.S. Cl. ................................................ 152/209 R
[58] Field of Search ........................ 152/209 R, 209 D

[56] References Cited

U.S. PATENT DOCUMENTS

| | | | |
|---|---|---|---|
| 4,319,620 | 3/1982 | Knill | 152/209 R |
| 4,649,975 | 3/1987 | Kogure et al. | 152/209 R |
| 4,683,928 | 8/1987 | Yahagi | 152/209 R |
| 5,160,385 | 11/1992 | Goto et al. | 152/209 R |

FOREIGN PATENT DOCUMENTS

| | | | |
|---|---|---|---|
| 3712155 | 10/1987 | Fed. Rep. of Germany . | |
| 0001603 | 1/1987 | Japan | 152/209 R |
| 0122804 | 6/1987 | Japan | 152/209 R |
| 0263105 | 10/1988 | Japan | 152/209 R |
| 2299909 | 12/1990 | Japan | 152/209 R |
| 0357419 | 9/1931 | United Kingdom | 152/209 R |
| 0535164 | 3/1941 | United Kingdom | 152/209 R |

Primary Examiner—John J. Gallagher
Assistant Examiner—Nancy T. Krawczyk
Attorney, Agent, or Firm—T. P. Lewandowski

[57] ABSTRACT

A pneumatic tire tread with at least one circumferentially extending row of high stiffness blocks and one of low stiffness blocks where the low stiffness blocks are between 4 to 10% greater height than the high stiffness blocks.

1 Claim, 6 Drawing Sheets

TREAD FOR A PNEUMATIC TIRE WITH DIFFERING TREAD STIFFNESS REGIONS

This is a continuation-in-part of U.S. patent application Ser. No. 07/524,616, filed May 17, 1990, now abandoned.

The present invention relates to a tread for a pneumatic radial tire.

The tread portion of a pneumatic tire generally comprises an elastomeric material having a plurality of grooves therein defining ground engaging rubber elements. The particular size and shape of these elements contributes significantly to the overall performance of the tire. Tires are generally designed to provide a particular performance, such as for instance winter, high traction or high speed performance. The obtaining of one particular performance characteristic is at odds with obtaining another one. For example, the achievement of good winter performance is obtained at the cost of a reduction of ride comfort, and good dry traction of a tire is obtained by a reduction of winter performance.

A tread pattern which provides acceptable all season performance of a tire while maintaining ride, noise and handling characteristics required from tires used in warm seasons has, for instance, been disclosed in European Patent Application No. 0 139 606.

To achieve all season type tire characteristic, tread designs exhibiting low circumferential stiffness are usually chosen because they lead to tires having more uniform behavior during the different seasons. Low stiffness tread designs are, however, particularly of nuisance in front wheel driven cars, having high load transfer on the front axle during braking and cornering where the tread block elements have to operate under a wide range of lateral and circumferential forces. Due to the high block deformation of all season tread designs on high friction surfaces combined with the high load transfer behavior of front wheel driven cars, known all season type tires perform only marginally as well against summer type tires on high friction surfaces.

French patent 1 214 717 teaches a way to improve road adherence by providing the tread pattern with raised block elements. The raised elements are described as acting as elastic, heavily compressed projections entering the small holes in the road surface and improving thereby the grip of the tire.

It is also known to make the axially centermost part of the tread of a softer or more resilient rubber than that from which the side tread elements are made. As disclosed in U.S. Pat. No. 1,664,352, such a construction is alleged to lead to a better road contact.

An object of the invention is to create an all season type tire tread having a more uniform handling responce during a wide variety of operating conditions.

It is a further object of the invention to create a tread having an excellent grip on high friction road surfaces while maintaining an acceptable grip on low friction surfaces.

This object is met by the tire tread as described in the appended claims.

The stiffness of a tread is measured in the footprint of the tire under rated load conditions, and is generally a stiffness measurement in the circumferential direction (longitudinal stiffness) or axial direction (lateral stiffness). The stiffness of a "high-stiffness" tread element equals the stiffness of a tread element of a summer tire, and is 3-6 times higher than the stiffness of a "low-stiffness" tread element, which equals the stiffness of a winter tire tread element. For the purpose of the instant description, only longitudinal stiffnesses are considered. The longitudinal stiffness of a tread element of a winter tire ranges usually between 150 and 300 kg.F/m, whereas the longitudinal stiffness of a tread element of a summer tire ranges usually between 800 and 1,500 kg.F/m. The tread elements of prior art all season tires have longitudinal stiffnesses comprised between 300 and 800 kg.F/m and usually around 500 kg.F/m.

There is provided in accordance with the present invention a pneumatic tire behaving most uniformly irrespective of the road surface conditions. To that effect high stiffness and low stiffness tread elements are combined into one tread pattern. When distributing the high and the low stiffness elements on the tread surface, it must be borne in mind that the pressure distribution in the footprint varies across the footprint width, namely a pressure is generally high in the shoulder areas and, somewhat less in the center area of the tire, and lowest in the intermediate areas. Putting low stiffness tread elements into the intermediate areas and giving them a raised profile produces a more uniform pressure distribution in the footprint. Though a great number of factors determine treadwear of straight and free rolling tires, treadwear is important in those places where the highest relative movements between tire surface and road take place. The more evenly distributed pressures of the tire according to the invention result in smaller sliding movements, hence slower tread wear.

The high pressure in the shoulder regions results from the transition conditions between the tread band and the sidewall. Inasmuch as the stiff tread elements are lodged in these regions, the majority of radial and longitudinal forces is taken by these elements on high friction street surfaces, while the raised low stiffness block elements bend and contribute much less to the overall grip and handling properties of the tire. On low friction street surfaces, however, the raised flexible elements maintain an acceptable grip and predominate the behavior of the tire.

A further refinement of the invention is to be seen in the orientation of the slots in the block elements. In order to improve the load transfer characteristics during braking, traction and lateral acceleration efforts, the slot orientation is preferably oblique to the equatorial plane, making an angle with the equatorial plane comprised between 30° and 60°. The equatorial plane EP is defined as being a plane perpendicular to the tire's axis of rotation and passing through the center of its tread.

Furthermore, to increase the range of stiffness of the low stiffness block elements, the distance between neighboring slots can be varied in the same block element so that, for instance, the centermost slots are more closely spaced than those located near the block's edges. It is also possible to provide neighboring block elements with different slot spacings. The same can be accomplished with the use of holes at voids to acquire the desired stiffness. The resulting benefit will be, apart from a lower noise level, a more uniform tire behavior.

A tread for a pneumatic tire according to the present invention has an annular shaped band of elastomeric material when in place on the tire which has a central portion and two lateral portions, each lateral portion having grooves therein defining at least a pair of circumferentially extending rows of blocks, one of high stiffness and the other of low stiffness. The central portion has grooves defining at least one circumferentially extending row of low stiffness blocks, all the low stiffness blocks having a radial height being between 8% and 18% greater than the radial height of said high stiffness blocks when measured from the bottom of the tread groove and a volume density of less than 92%. The high stiffness blocks have a volume density greater than 92% and are separated from the low stiffness blocks by at least a slot if not a groove.

In order to fully take advantage of the properties of the tires during their whole lifetime by ensuring comparable wear of the high and low stiffness elements, it is preferred to mount the tires on vehicles having their traction evenly distributed between the front and rear axle, i.e. on four wheel drive vehicles.

To acquaint persons skilled in the art most closely related to the instant invention, certain preferred embodiments are herein described with reference to the annexed drawings. These embodiments are illustrative and can be modified in numerous ways within the spirit and scope of the invention defined in the claims.

As used herein and in the claims, an equatorial plane means the plane perpendicular to the tire's axis of rotation and passing through the center of its tread. The terms "radial" and "radially" are understood to refer to directions that are perpendicular to the axis of rotation of the tire, the terms "axial" and "axially" are used herein to refer to lines of directions that are parallel to the axis of rotation of the tire and the terms "lateral" and "laterally" are understood to refer to directions going from one sidewall of the tire towards the other sidewall of the tire.

"Groove" means an elongated void area in a tread that may extend circumferentially or laterally in a straight, curved or zig-zag manner; the circumferentially and the laterally extending grooves of the pattern described hereafter, may have common portions. The grooves are subclassified as "wide", "narrow" or "slot". A "wide" groove usually has a width greater than 3% of the tread width whereas a "narrow" groove has a width in the range from about 0.8% to 3% of the tread width. A "slot" is a groove having a width in the range from about 0.2% to 0.8% of the tread width. Slots are typically formed by steel blades inserted into a cast or machined mold; as they are so narrow, they are illustrated by single lines. "Tread width" (TW) is defined as the greatest axial distance across the tread, as measured from a footprint of the tire, when the tire is mounted on its design rim, subjected to a design load, and inflated to a design pressure for said load.

All of the other tire dimensions used herein and in the claims refer to a tire having been mounted on its specified rim and inflated to its specified inflation pressure while not being subject to any load. It is, however, to be understood that the invention applies to new tires and to retreaded tires as well as to tire treads in strip form being at least partly vulcanized and having a pattern of grooves and raised elements integral therewith.

Figure 1:
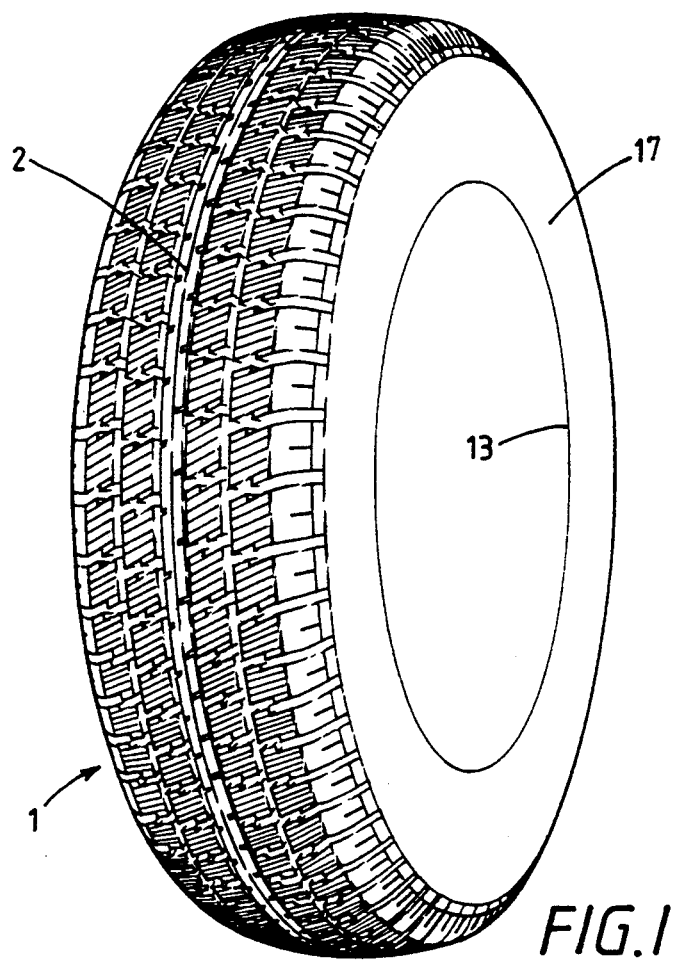
FIG. 1 is a perspective view of a tire embodying a tread made in accordance with the present invention.
Figure 2:
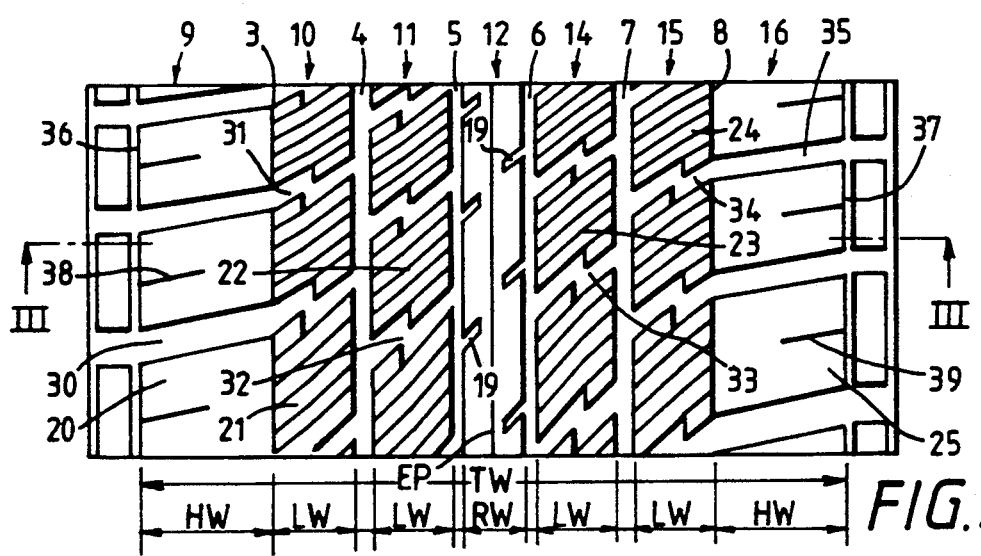
FIG. 2 is an enlarged fragmentary view of a portion of the tread of FIG. 1.

Referring to FIGS. 1 and 2, there is represented a pneumatic tire and a portion of a tread made in accordance with the present invention. The tire 1 is of the radial type construction and designed for use on passenger vehicles. The ground engaging portion 2 includes four circumferentially extending straight grooves 4–7 and two series of circumferentially extending straight slots 3 and 8. The various grooves and slots are axially spaced apart across the surface of the tread and divide the tread into circumferentially extending rows 9–11 and 14–16 of blocks and a circumferentially extending rib 12. The circumferentially extending slots 3, 8, separate the rows 10, 15 of low stiffness elements from the rows 9, 16 of high stiffness shoulder blocks which flank the tread 2 and wherethrough the tread is joined to a pair of sidewalls 17 that extend radially inwardly from the tread with each sidewall terminating in a bead 13.

The two centermost circumferentially extending grooves 5, 6 define a high stiffness central rib 12, having an axial width RW and extending substantially an equal distance on either side of the equatorial plane EP. The width RW of the central rib ranges from about 7% to 25% of the tread width TW of the ground engaging tread portion. The central rib 12 is provided with a plurality of semi-blind transverse narrow grooves 19, starting in the two centermost circumferentially extending grooves 4, 5 and extending only partly across the central rib. The transverse narrow grooves 19, starting from one of the circumferentially extending grooves 5, 6 alternate circumferentially with those starting from the other circumferentially extending groove 6, 5.

On both sides of the central rib 12 are circumferentially extending rows 11, 14 of blocks comprising block elements 22, 23 separated by a series of transversely extending grooves 32, 33 connecting the circumferentially extending grooves 4 and 5 respectively 6 and 7 which border the rows of blocks. The transversely extending grooves are disposed circumferentially about the tire in a repetitive manner, their widths and inclinations depending on the pitch variation, as is practiced in the industry for noise reduction. For example, as shown in FIGS. 1 and 2, each transversely extending groove 31, 32, 33, 34, can be a zig-zag groove with three legs, the first and third legs forming an angle between 30° and 60° with the equatorial plane, and the second leg being parallel to the equatorial plane. The block elements 22, 23 of the intermediate rows 11, 14 are raised, low stiffness elements, having an axial width LW ranging between 8% and 20% of the tread width TW. The stiffness of the block elements is adjusted through a high number of parallel slots having a surface density between 1.5 to 2.5 cm of slot length per $cm^2$ of the radially outermost surface of a block and a volume density between 1.05 and 1.75 $cm^2$ of slot area per $cm^3$ of the block volume. The slots make an angle with the equatorial plane ranging between 30° and 60°.

Figure 3:
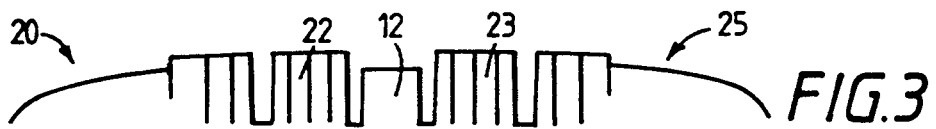
FIG. 3 is a cross-section of the tread pattern of FIG. 2, along the line III—III.

The difference in radial height of the low stiffness elements vis-a-vis radial height of the stiff central rib 12 is comprised between 8% and 18%, and is preferably about 12% (see FIG. 3); put another way, a high stiffness element has in a preferred embodiment about 88% of the radial height of a low stiffness element when measured from the bottom of the tread groove. In the embodiment shown in FIG. 2, the slots make an angle of about 45° with respect to the equatorial plane EP. In order to have an improved load transfer of the vehicle and this, primarily, during braking, traction and under lateral efforts, the slot orientation should make with the equatorial plane an angle comprised between 30° and 60°.

Between the intermediate rows 11 and 14 of low stiffness block elements and the rows 9 and 16 of high stiffness shoulder block elements, is located a second set of circumferentially extending rows 10 and 15 of low stiffness blocks. The various block elements 21, 24 are defined by circumferentially extending grooves 4, 7 and slots 3, 8 and by transversely extending grooves 31 and 34 respectively. The circumferentially extending slots 3, 8 have a depth ranging between 40% and 60% of the depth of the circumferentially extending grooves 4–7. In the embodiment shown in FIG. 2, the blocks 21, 24 of the second set of circumferentially extending rows of blocks have substantially the same axial width LW and the same layout as the blocks 22, 23 of the first set of circumferentially extending rows of blocks.

The rows 9 and 16 shoulder blocks comprise block elements 20 and 25 respectively which are separated by transversely extending grooves 30 and 35 making an angle of about 60° to 90° and preferably between 75° and 85° with respect to the equatorial plane of the tire. The high stiffness block elements 25 and 26 each have a width HW ranging from 10% to 25% of the tread width TW.

A circumferentially extending narrow groove 36 and 37 is located at each axial edge of the tread and separates the high stiffness block elements 20 and 25 from the shoulder portions.

Each high stiffness block 20, 25 includes one single slot 38, 39 therein extending to one peripheral edge of the block only, so as to maintain acceptable handling and wear characteristics. The transverse slots 38 and 39 start preferably from the respective circumferentially extending narrow grooves 36 and 37 and are disposed about halfway between the adjacent transversely extending grooves 30, 35.

The distribution of high and low stiffness elements shown in FIG. 2 reduces the forces acting upon the intermediate elements and consequently increases the load on the center portion of the tire and the stiff elements of the shoulder portions, achieving thereby an improved load transfer sensitivity.

Figure 4:
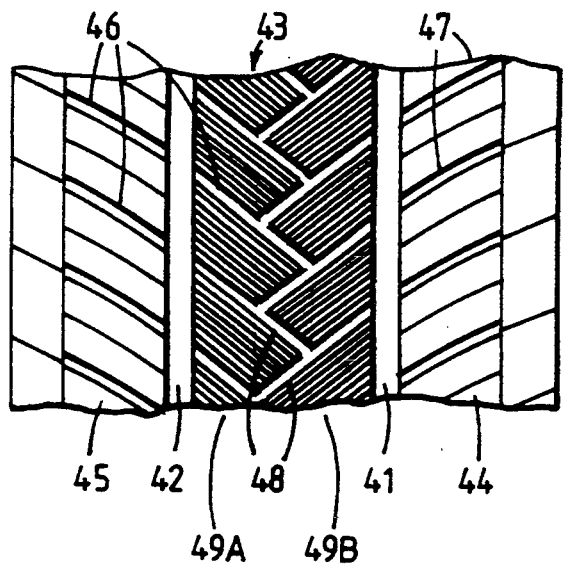
FIGS. 4 and 5 are enlarged fragmentary views of modified tread patterns made in accordance with the invention.

In FIG. 4, there is shown a tread portion of a tire made according to the teachings of the invention which has a directional tread pattern. Two circumferentially extending grooves 41 and 42 separate a raised, low stiffness center portion 43 from two rows of high stiffness shoulder blocks 44 and 45. The tread has a series of laterally extending grooves 46 and 47 the coincident portions of which cooperate to define a zig-zag center groove 48. The laterally extending grooves 46 and 47 extend through the shoulder rows of blocks 44 and 45 and follow paths that are oriented at progressively greater angles with respect to the equatorial plane, as the axial distance from the equatorial plane becomes greater. The low stiffness center portion 43 is divided by the zig-zag groove 48 into a first and second row 49A, 49B of low stiffness blocks having a high number of slots therein. The slots in the blocks of the first row 49A of blocks form an angle between 70° and 90° with respect to the slots in the blocks of the second row 49B of blocks.

Figure 5:
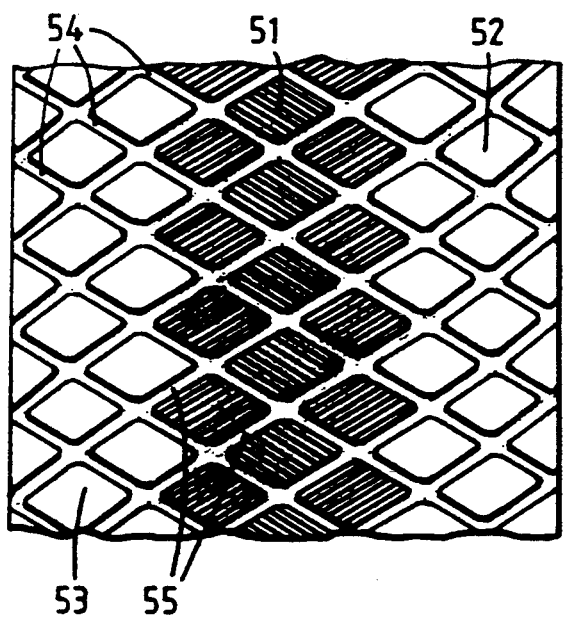

In FIG. 5, there is shown a tread portion comprising an array of diamond shaped blocks 51, 52 and 53. The lateral edges of the neighboring blocks define a first and a second series of grooves 54, 55, extending diagonally across the tread. The first series of grooves 54, makes with the second series of grooves 55 an angle between 60° and 90°. In the embodiment shown in FIG. 5, the blocks 51 of the centermost row, as well as the blocks of the two laterally neighboring rows are provided with a high number of parallel slots therein. The slots of the centermost row of blocks form an angle between 60° and 90° with the slots of the blocks of the two neighboring rows. The rows in the shoulder portions of the tread include high stiffness blocks 52 and 53 having about 10% smaller radial height than the low stiffness blocks 51.

Figure 6:
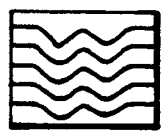
FIGS. 6 to 9 show enlarged block elements of tires made according to other embodiments of the invention.

It is to be understood that in order to reduce the stiffness of a tread element, the slots need not be straight, but can take a wave shape as shown in FIG. 6.

Figure 7:
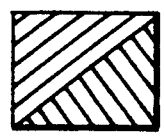

Similarly, the neighboring slots or the neighboring parts of two slots need not be parallel. Two or more sets of parallel slots, equally spaced or not, can be included into one single block. A design including for instance two sets of slots is shown in FIG. 7. This design results in a more neutral behavior of a block element having regard to lateral forces on the tire.

Figure 8:
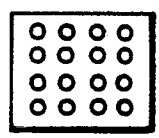

Though the preferred embodiments of the invention disclosed hereabove include low stiffness blocks obtained by using a high number of slots, other methods resulting in the lowering of the stiffness and improvement of the grip of a rubber block can be used to implement the invention. FIG. 8 shows for instance a low stiffness rubber block comprising holes with a circular section. A hole density, i.e. hole volume per total block volume, between 8% and 15% is preferred. The diameter of a hole can range between 1 and 3 mm.

Figure 9:
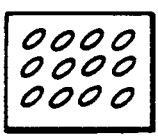

In an alternate embodiment shown in FIG. 9, the holes have oblong, for instance ellipsoidal, cross-sections. The major axes of the cross-sections of these holes can have inclinations comprised between about 30° and 60° with respect to the equatorial plane of the tire. Preferably, major axes of the cross-sections of the holes in neighboring blocks do not have the same inclination. The inclination of the major axes of the holes in a block with respect to the equatorial plane can, for instance, increase as the distance of said block from the equatorial plane increases. Alternatively, the inclination of the major axes of the holes of one block can make an angle between 45° and 90° with the inclination of the major axes of the holes in a neighboring block.

From the above description, it is clear that block flexibility arises from both the introduction of slots and/or holes i.e. a variation of volume density of a solid block as compared to one with slots and/or holes, the latter being more flexible. For purposes of this invention, a flexible block must have a volume density of less than 92% where volume density is the only factor other than the height of the block which affects flexibility of the block.

In the embodiments of the invention described so far, the low stiffness and the high stiffness block elements are made from material having basically the same composition, the required difference in physical properties of the block elements being obtained exclusively through an appropriate design of the mold matrix. There is, of course no departure from the scope of the invention by using different elastomeric compounds in the tread. An elastomeric compound having for instance a Shore A hardness in the range between 50 to 60 in the vulcanized state, can be located on the unvulcanized tire, where the low stiffness block elements have been designed in the mold matrix, whereas an elastomeric compound having a Shore A hardness in the range between 65 to 75 in the vulcanized state, can be located on the unvulcanized tire, where the high stiffness block elements have been designed in the mold matrix. In order to allow an efficient assembly of the unvulcanized tires, according to this embodiment, tread designs wherein the high stiffness elements are separated from the low stiffness elements by straight circumferentially extending grooves are preferred.

FIGS. 10 to 17 illustrate further embodiments of the present invention. The tread designs shown in FIGS. 10 to 12 have three circumferentially extending grooves. In FIGS. 14–17, the tread design has in each shoulder portion a circumferentially extending groove with groove walls designed specifically to channel water out of the footprint of the tire, so-called "Aqua Channels".

The embodiments of the invention shown on FIGS. 10, 11 and 14, 15 have the same elastomeric compound in the tread, whereas the embodiments shown on FIGS. 12, 13 and 16, 17 have two different elastomeric compounds, a harder compound for the shoulder rows of blocks and a softer compound for the rows of blocks adjacent to the equatorial plane.

The different rows of blocks have a volume density of about 84 to 92%. In the embodiments shown, the volume density is about 88% for the different rows. The volume density of the rows neighboring the EP is slightly lower in the case of the FIGS. 12, 13 and 16, 17 than in the case of FIGS. 10, 11 and 14, 15.

Figure 10:
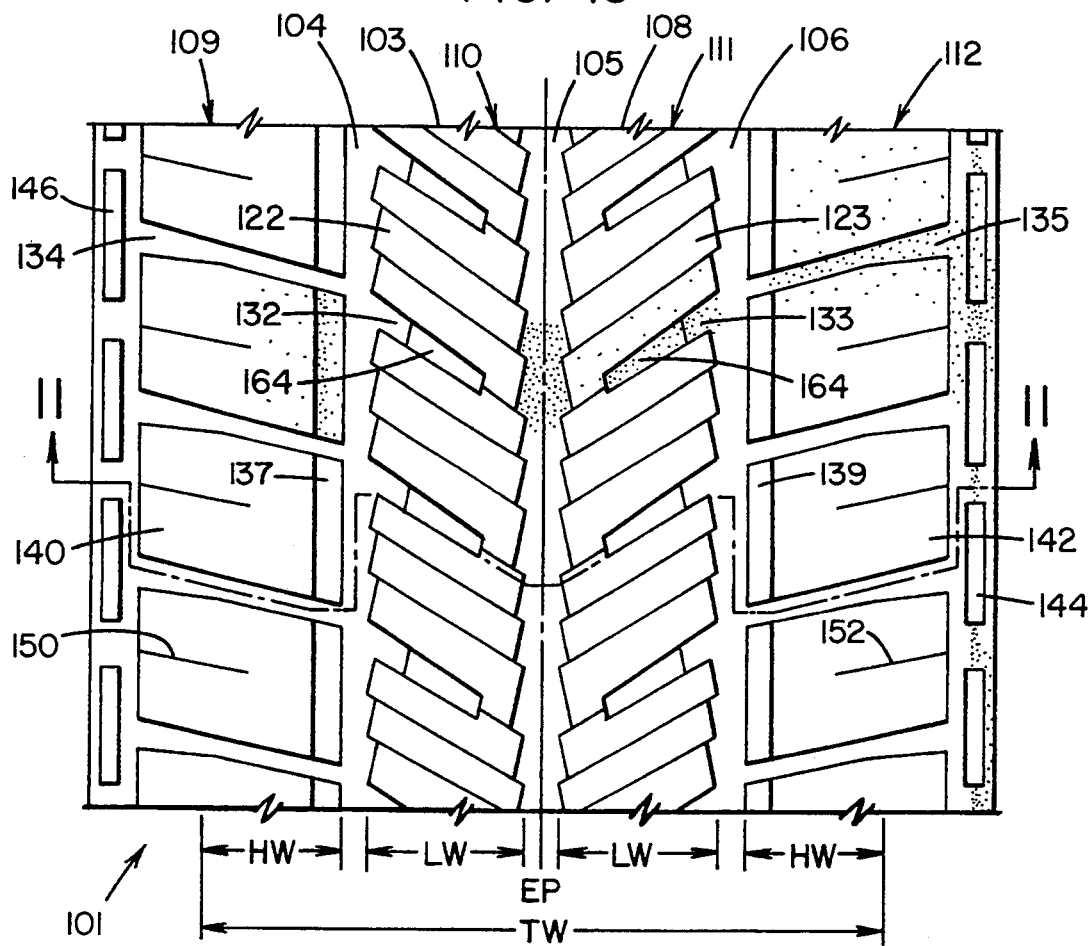
FIGS. 10 to 13 show two other embodiments of treads with varying groove depths and slots.
Figure 11:
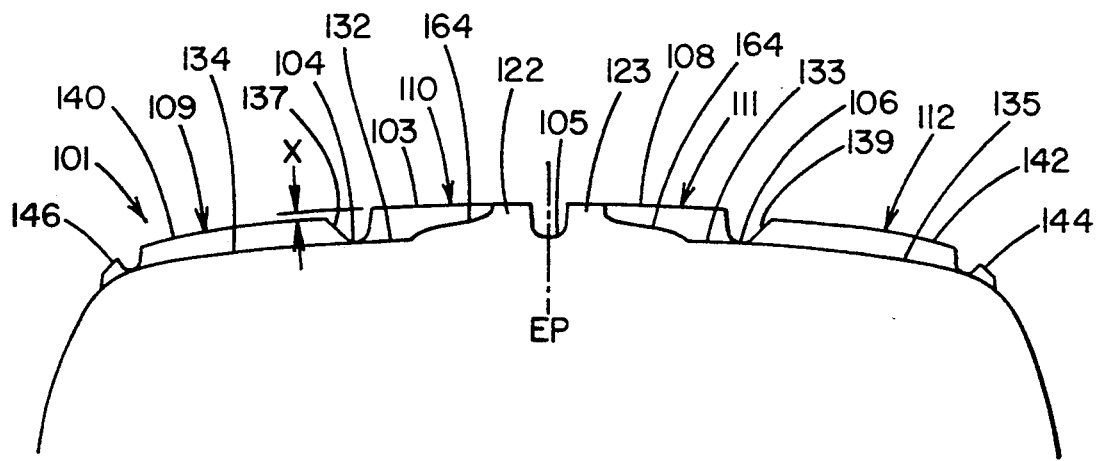

Referring to FIGS. 10 and 11, there is represented another embodiment of a pneumatic tire and a portion of a tread made in accordance with the present invention. The tire is of the radial type construction and designed for use on passenger vehicles. The ground engaging portion 101 includes three circumferentially extending straight grooves 104–106 and two series of circumferentially spaced slots 103 and 108. The various grooves and slots are axially spaced apart across the surface of the tread and divide the tread into circumferentially extending rows 109–110 and 111–112 of block, the circumferentially extending rib having been eliminated. The circumferentially spaced slots 103, 108, separate the rows 110, 111 of low stiffness elements from the rows 109, 112 of high stiffness shoulder blocks which flank the tread 101 and wherethrough the tread is joined to a pair of sidewalls that extend radially inwardly from the tread with each sidewall terminating in a bead (not illustrated) .

Figure 12:
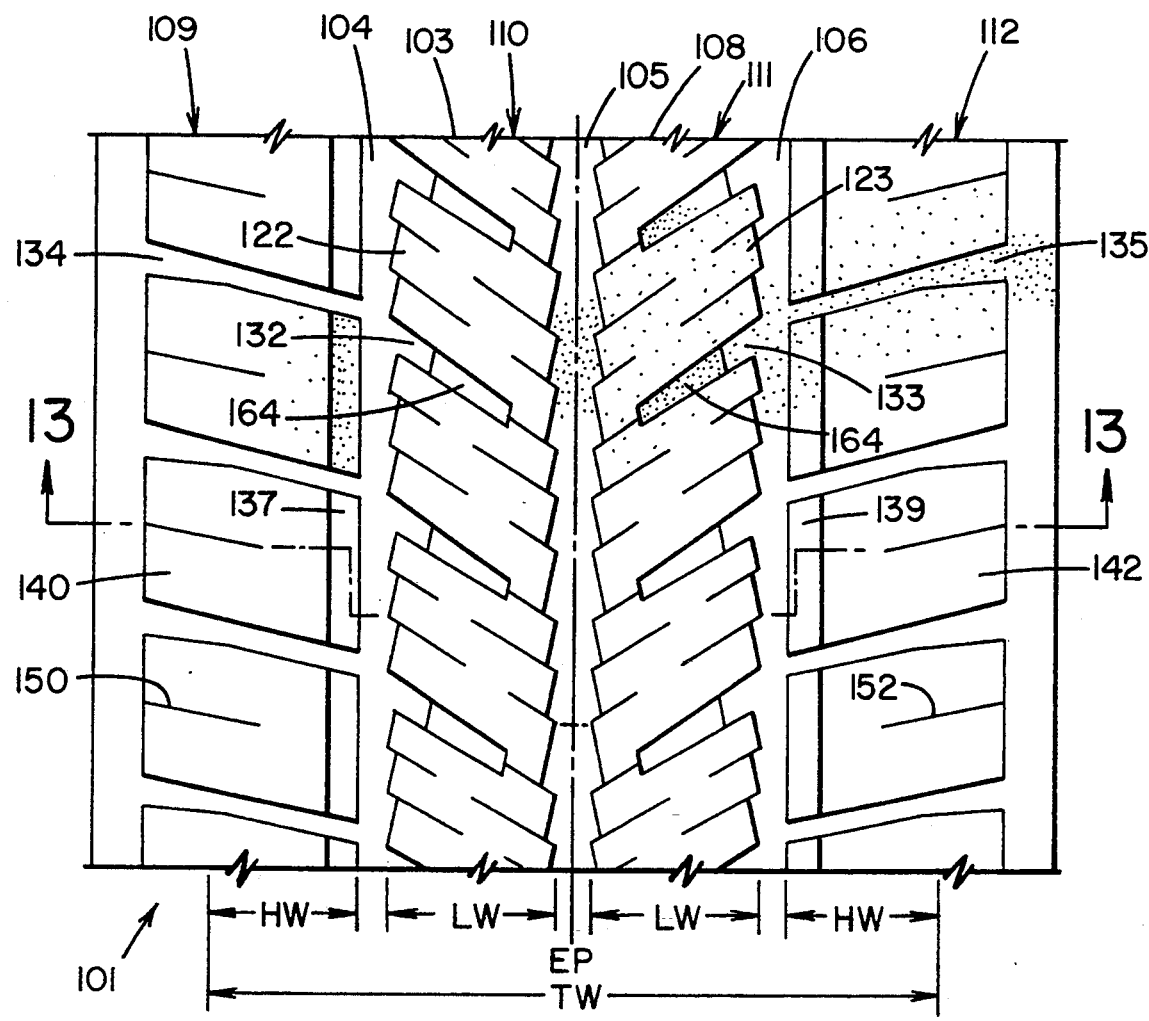
Figure 13:
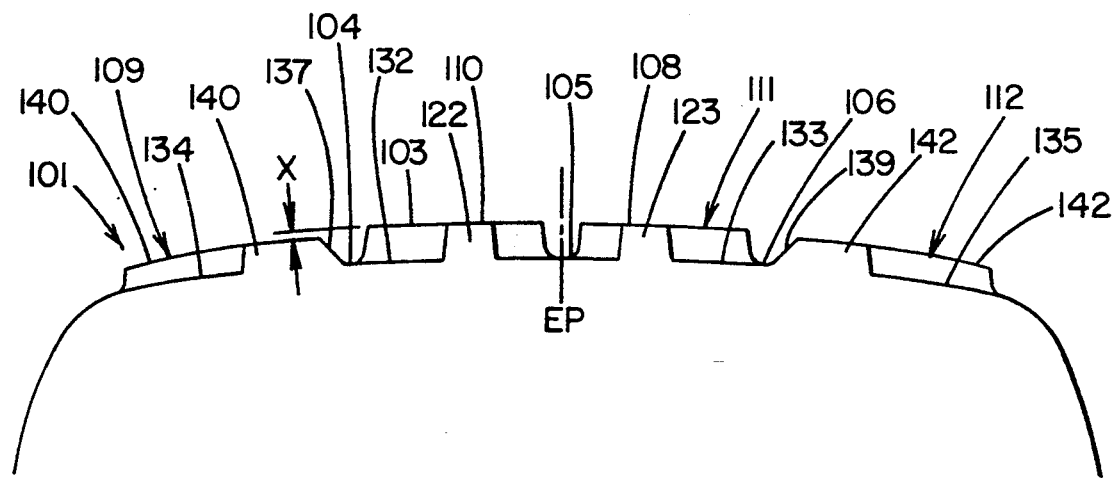
Figure 14:
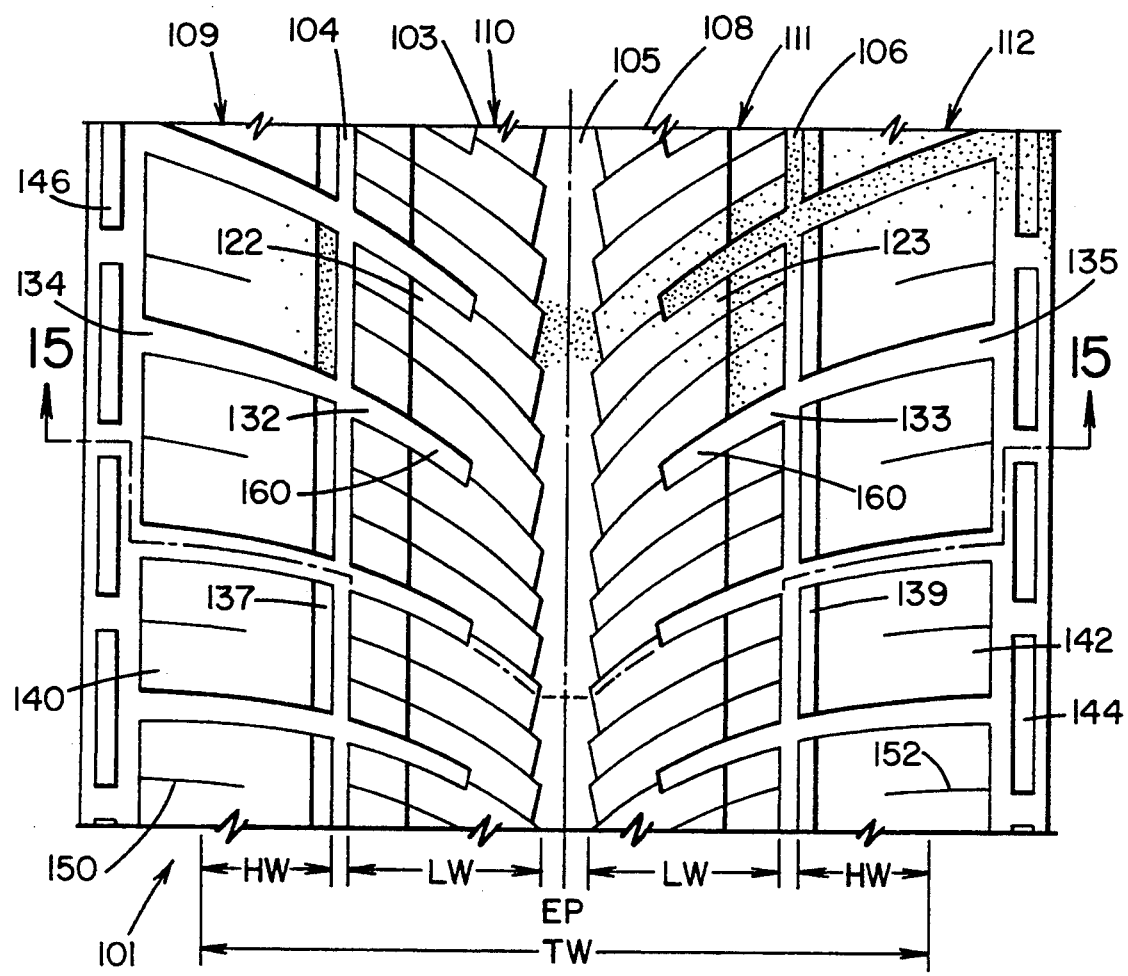
FIGS. 14 to 17 show still another embodiment of treads with different varying groove depths and slots.

On both sides of the central groove 105 are circumferentially extending rows 110, 111 of blocks comprising block elements 122, 123 separated by a series of transversely extending grooves 132, 133 in between the circumferentially extending groove 105 and respectively 104 and 106 which border the rows of blocks. The transversely extending grooves are disposed circumferentially about the tire in a repetitive manner, their widths and inclinations depending on the pitch variation, as is practiced in the industry for noise reduction. For example, as shown in FIGS. 10 and 12, each transversely extending groove 132, 133, 134, 135, can be a closed end or open interconnecting circumferential grooves. The block elements 122, 123 of the intermediate rows 110, 111 are raised, low stiffness elements, having an axial width LW ranging between 15% and 25% of the tread width TW. The stiffness of the block elements is adjusted through a high number of parallel slots having a surface density between 0.7 to 1.7 cm of slot length per $cm^2$ of the radially outermost surface of a block and a volume density between 0.5 and 1.2 $cm^2$ of slot area per $cm^3$ of the block volume. The slots make an angle with the equatorial plane ranging between 40° and 70°. The slots in FIG. 12 are discontinuous while those in FIG. 10 extend across the blocks.

The difference x in radial height of the low stiffness elements vis-a-vis radial height of the stiff row of blocks 109, 112 is comprised between 4% and 10%, and is preferably about 7% (see FIGS. 11 and 13); put another way, a high stiffness element has in this preferred embodiment about 93% of the radial height of a low stiffness element when measured from the bottom of the tread groove. In the embodiment shown in FIGS. 10 and 12, the slots make an angle of about 60° with respect to the equatorial plane EP. In order to have an improved load transfer of the vehicle and this, primarily during braking, traction and under lateral efforts, the slot orientation should make with the equatorial plane an angle comprised between 40° and 70°.

Between the intermediate rows 110 and 111 of low stiffness block elements and the rows 109 and 112 of high stiffness shoulder block elements, is located a series of lands 137 and 139 created by the slope of the high stiffness blocks 140 and 142 extending into the grooves 104 and 106. The circumferentially extending slots 103, 108 have a depth ranging between 40% and 60% of the depth of the circumferentially extending grooves 104–106.

The rows 109 and 112 shoulder blocks comprise block elements 140 and 142 respectively which are separated by transversely extending grooves 134 and 135 making an angle of about 60° to 90° and preferably between 75° and 85° with respect to the equatorial plane of the tire. The high stiffness block elements 25 and 26 each have a width HW ranging from 15% and 30% of the tread width TW.

A circumferentially extending narrow element 144 and 146 may be located at each axial edge of the tread for appearance purposes.

Each high stiffness block 140, 142 includes one single slot 150, 152 therein extending to one peripheral edge of the block only, so as to maintain acceptable handling and wear characteristics. The transverse slots 150 and 152 start preferably from the respective circumferentially extending tread edge and are disposed about halfway between the adjacent transversely extending grooves 134, 135.

The distribution of high and low stiffness elements shown in FIGS. 10 and 12 reduces the forces acting upon the intermediate elements and consequently increases the load on the center portion of the tire and the stiff elements of the shoulder portions, achieving thereby an improved load transfer sensitivity.

Because the low stiffness blocks 122 and 123 have a Shore A hardness between 55 and 65 while the high stiffness blocks 140 and 142 have a Shore A hardness of 65 to 75, the flexibility of the low stiffness blocks is not solely dependant upon either the height or volume density of the blocks.

Figure 15:
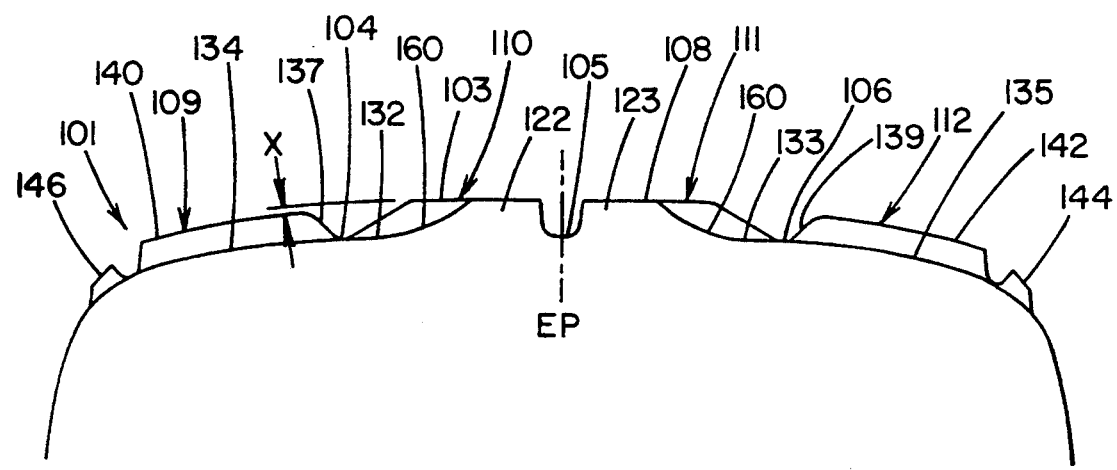
Figure 16:
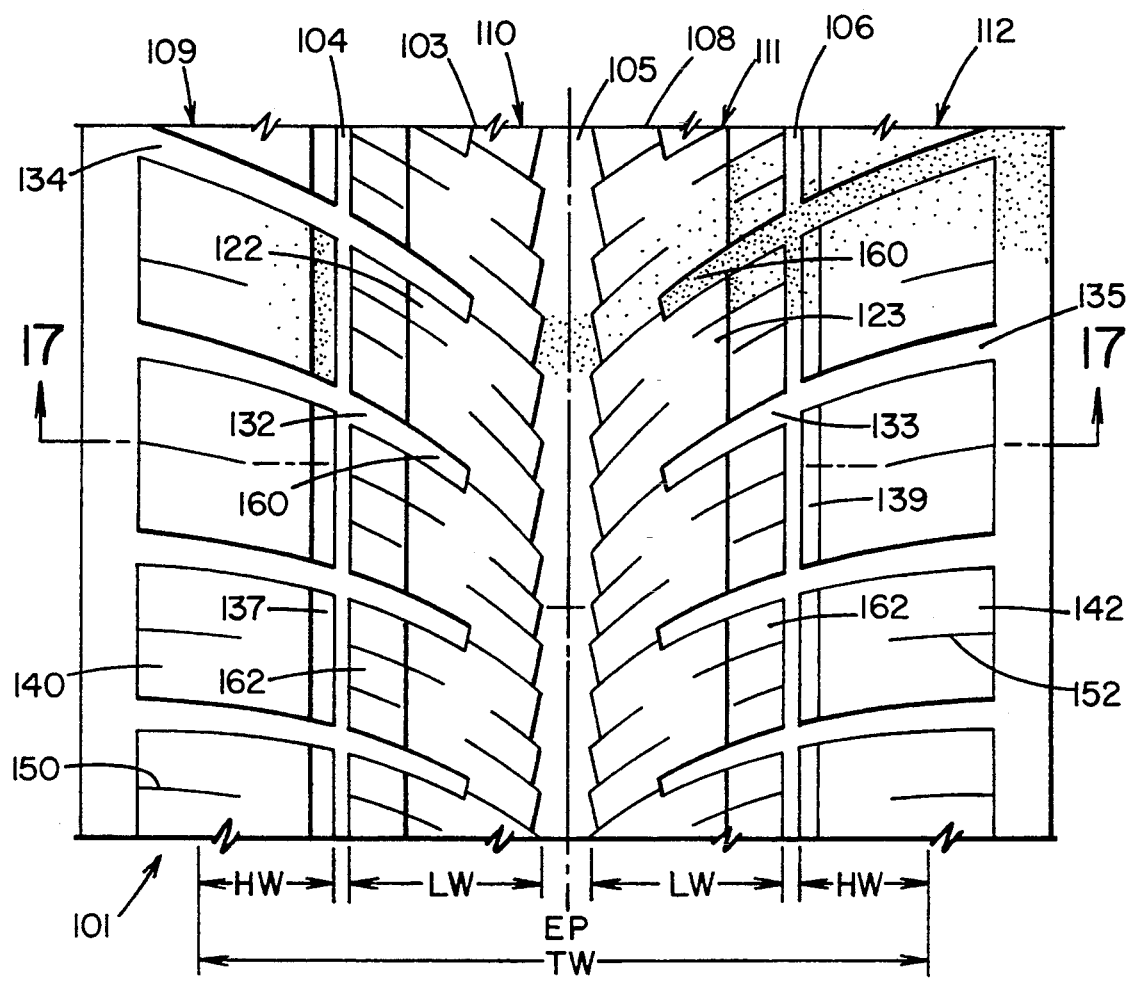
Figure 17:
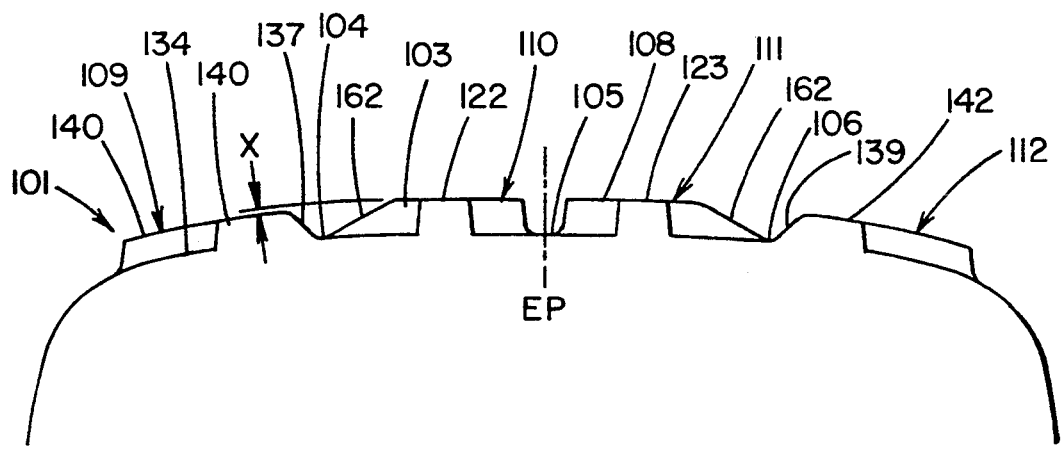

In FIGS. 14 to 17 and particularly FIGS. 15 and 17, there is illustrated still another embodiment of the present invention wherein the slots can be seen to have variable depth which can be concave 160 or convex 162 which is another way of varying the flexibility of the blocks. In FIG. 11, the grooves 132 and 133 can be seen to have variable depth in humps 164.

Another embodiment of the invention comprises choosing an elastomeric compound having a Shore A hardness in the range of 50 to 60, adapted to give the low stiffness block elements the required physical properties and to embed in the elastomeric material, where the high stiffness block elements are to be formed, metallic or non-metallic fibers. In a preferred embodiment, the elastomeric matrix material has short fibrillated fibers dispersed therein. A fibrillated fiber comprises a trunk portion with a plurality of fibrils extending outwardly from the trunk portion and having diameters substantially smaller than the diameter of the trunk portion from which they extend. Preferred fibers are aramid fibers having an average length in the range of 2 to 5 mm. Full details of a tire tread containing such fibrillated fibers can be found in commonly owned U.S. Pat. No. 4,871,004.

I claim:

1. A tread for a pneumatic tire comprising an annular shaped band of elastomeric material when in place on the tire, said tread having a central groove and two lateral portions, each lateral portion having grooves therein defining at least one circumferentially extending row of high stiffness blocks and one row of low stiffness blocks, all low stiffness blocks having a radial height being between 4 to 10% greater than the radial height of said high stiffness blocks when measured from the bottom of the tread groove and a Shore A hardness of less than 65.

* * * * *